Patented Dec. 10, 1935

2,024,103

UNITED STATES PATENT OFFICE 2,024,103

CATALYTIC PROCESS OF POLYMERIZING OIL AND POLYMERIZATION ACCELERATOR EMPLOYED THEREIN

Wilhelm Krumbhaar, Detroit, Mich., assignor to Beck, Koller & Company, Inc., Detroit, Mich., a corporation of Delaware No Drawing. Application October 24, 1934, Serial No. 749,863

22 Claims. (Cl. 87—12)

This invention relates to a catalytic process for polymerizing oil and the improved polymerization accelerator employed therein.

Heretofore, oils have been polymerized by heating at high temperature either with or without inert gases under either vacuum, under normal pressure, or in the autoclave. By a polymerized oil is meant an oil in which its molecules are united by means of its free bonds without any substantial satisfaction of these bonds previously by the introduction of any added elements or substances. Many suggestions have been made to accelerate the polymerization process of oils by the use of catalysts, but most of these catalysts darken the oils, or in the case of drying oils decrease their drying strength. Some of the catalysts also cause serious decomposition or partial gelatinization. It is known that metal salts, dissolved in the oils, as for instance, the oleates, naphthanates, resinates, etc., as well as certain metal carbonyls, when dissolved in the oil, have some accelerating effect on polymerization. Also finely divided metal particles made in the usual way, for instance by heating the formiates in the oil, have a certain effect, but their use is impracticable because of their slow action and the necessity of filtering them from the viscous oil after polymerization.

I have now discovered a method for accelerating the bodying process of polymerizable oils, both drying and non-drying, which is more efficient than the methods known heretofore and which has not the disadvantages of the former processes, and possesses special merits when used in connection with drying oils. The advantages consist in the fact that the process is completed in a shorter time at lower temperatures, and in a simpler procedure, that is to say without pressure or without vacuum, and furthermore in the fact that the products are lighter in color and free from decomposition products.

The process is based on the use of electrically dispersed heavy metals as catalysts, as for example, cobalt, manganese, iron and lead, as well as nickel, chromium, molybdenum and tungsten. These electrically dispersed metals are of higher catalytical efficiency than other colloidal metals, because they can be obtained in a finer state of subdivision by the electrical dispersion. In addition, my process applies to the colloidal metals in such a way that they are prevented from becoming agglomerated. The metals are dispersed by oscillating discharge in mediums miscible with oils, and a small amount of the colloidal solutions thus obtained are mixed at ordinary temperature with the oil, which is then heated up in order to be polymerized. Butyl alcohol is the best dispersion medium for the electrical production of oil miscible colloidal metal solutions, since it is the solvent in which the colloidal solutions are most stable. However, it has to be taken into consideration that such solutions can be easily flocculated by the addition of foreign substances or other colloidal solutions.

Butanol metal solutions without stabilizers will keep for a week, thus allowing ample time to use up the solution in the preparation of oils. Propyl alcohol is less satisfactory than butyl alcohol. For example, a lead solution in propyl alcohol will settle even after several hours. Mineral spirits also give unstable solutions, whereas turpentine is comparatively more satisfactory. The stability of the suspensions also depends largely on the particle size of the dispersed metal, which again may be widely varied by the conditions of the electrical dispersion.

Linseed oil blackens by carbonization when sparks are passed through it which, of course, is a disadvantage. On the other hand, the sparking occurs very easily in linseed oil and is much more intense than in the volatile dispersion mediums just mentioned. Since a definite intensity of sparking is desirable in the electrical dispersion of metals, it might seem advisable in some cases to add linseed oil to the butyl alcohol in order to facilitate sparking. In some cases it is practicable to cause dispersion of the metals into the oil alone, thus avoiding any foreign medium. The colloidal solutions made by electrical dispersion can be stabilized by being thickened with oil, but the thickening agent must be added immediately after the dispersion is completed. Older solutions will not usually withstand the addition of oil without being flocculated.

By electrical dispersion, colloidal solutions of all metals mentioned can be made up in known concentrations, and therefore fixed amounts of colloidal metal can be added to the oils. The percentage necessary for producing the accelerating effect on the polymerization process is very low, usually fractions of a percent being sufficient.

The color of all colloidal metal suspensions, made by electrical dispersion of the metals, is very dark, and the oils which are mixed with small percentages of these colloidal solutions become also comparatively dark in color. However, when these oils are in contact with the colloidal metals for a longer period of time, or are heated to higher temperature, the metals gradually go into true solution and the color becomes paler and paler. The velocity of this solution process depends upon the particle size of the metal which in turn is regulated by the conditions of the electrical dispersion procedure.

The present invention makes use of two special phenomena; first, of the fact that the finely divided electrically dispersed metals intensely accelerate the polymerization process, and secondly, that the colloidal metals gradually go into true solution forming metal salts, thus saving the filtration and, in case of drying or semi-drying oils, accelerating the drying process. By this method, therefore, it is possible to use the strong, accelerating effect of colloidal metals on the polymerization process without necessitating laborious filtration of finely divided metal from the viscous liquid.

The procedure for carrying out my process is very simple. A certain amount of the metal in colloidal solution is added to the oil that has to be polymerized. The mixture is heated up to the polymerization temperature, whereby the solvent is evaporated, and kept at this temperature until the consistency is reached whereby care has to be taken that the colloidal metal has completely gone into true solution. The consistency may vary from thin oily to nearly gelatinous. Instead of an unpolymerized oil, an oil that has already been polymerized to a certain degree can be used for further polymerization. It is also possible to use mixtures of oils, for instance of linseed and wood oil. During polymerization preferably a stream of $CO_2$ is passed through the oil in order to avoid oxidation.

In the case of polymerizing drying oils, such as linseed oil, my process has the special advantage of enabling one to incorporate the drier metal, which acts as a drier in the drying of the film, such as cobalt, manganese, iron, etc., as a catalyst during the polymerization process itself, and thus my invention, in a unique manner, combines in one process the advantages of the colloidally divided metals and of the metals in true solution. Thus the catalysts of the kettle cooking later become the drier of the finished varnish. The invention, however, is not limited to the treatment of drying oils, but is of more general application, and can be used for semi-drying oils, such as soya bean oil, or for non-drying oils, such as castor oil, etc.

The time required for dissolving the colloidal metals during the polymerization process varies according to the temperature of bodying and according to the particle size of the metals. The degree of subdivision in turn depends on the particular conditions of dispersing which have to be determined empirically. The best effects are obtained when the metal dissolves at the polymerization temperature in the course of that period of time that is necessary for the polymerization. For instance, in the case of linseed oil, 8 hours at about 530° F. is required. Too slow solution has an unfavorable effect on the color, and too quick solution does not develop the accelerating effect of colloidal metals.

Products made according to my process have wide application in industrial art, especially for making paints, varnishes and enamels, as well as molding compositions and electrical insulation products. They are especially fit for these appliances on account of their freedom from decomposition products, their good color, and in the case of drying oils, of their exceptionally good drying characteristics.

For the purpose of illustration, the following examples are given, it being understood that these are intended for illustration only of the inventive thought, rather than limiting the invention to the particular details set forth therein.

Example 1

Metallic cobalt is dispersed in butanol by the use of an oscillating discharge, generated by means of a spark conductor with a hammer circuit breaker, the capacity of which can be increased, if necessary, by connection with two Leyden jars. The current is passed through electrodes consisting of aluminum wire. The cobalt is placed between the electrodes in the form of metallic granules so as to gain more surface and thus higher velocity of dispersion. The electrodes and the metal are well covered with a deep layer of the butanol, the dispersion medium. The dispersion vessel must have thick walls, or otherwise it cannot withstand high tension sparking. The cobalt is easily dispersed thereby, brilliantly sparking, forming a deep black colloidal solution, which is entirely stable, especially when thickened with oil. The metal content of the suspension is determined when sufficient metal has been dispersed, and a measured amount of this solution is added to linseed oil so that there is about 0.01% by weight of cobalt present figured on the oil. The dark colored mixture of oil and colloidal solution is heated at 530° F. for several hours under a stream of $CO_2$ until the oil has become pale and viscous. In this way the polymerization goes on very quickly, the highest effect with the lowest amount of metal being obtained. The resulting oil is paler and more neutral than the product produced by the methods heretofore known, and at the same time has full drying strength without any additional drier.

Example 2

Manganese is electrically dispersed in accordance with the method described in Example 1. As a dispersion medium, propyl alcohol is used in which the metal disperses with a brownish black color. This solution is added to a mixture of 3 parts of linseed oil and 1 part of wood oil in such an amount that 0.05% manganese metal is present in the finished oil. The oil mixture containing the manganese is heated for four hours to 530° F., whereby the oil thickens and the manganese goes into true solution. The oil, owing to the quick polymerization at a comparatively low temperature, is very neutral and very compatible with pigments. In addition it has unusually good drying properties and does not require further additions of drier.

Example 3

Metallic iron is electrically dispersed in turpentine, according to the manner described in Example 1. This solution is added to a medium viscous stand oil of soya bean oil, in an amount such that 0.5% of iron is present in the finished oil. The further polymerization of the described mixture is carried through at a temperature of 575° F. during 10 hours, and the resulting oil has high elasticity and comparatively good color.

Example 4

Metallic cobalt is electrically dispersed in turpentine, according to the manner described in Example 1. This solution is added to coconut oil in an amount such that 0.2% of cobalt metal is present in the finished oil. The oil polymerizes very quickly at 575° F. The black color of the suspended metal disappears after the metal goes into solution; the light colored viscous liquid thus obtained requires no filtration before using.

What I claim is:

1. The process for bodying a polymerizable oil of the glyceride type, which comprises heating the oil with a colloidally dispersed heavy metal until a viscous oil is obtained.

2. A process for bodying a polymerizable oil of the glyceride type, which comprises heating the oil with a heavy metal colloidally dispersed electrically in an oil miscible organic medium, until a viscous oil is obtained.

3. The process for bodying a polymerizable drying oil, which comprises heating the oil with a heavy metal colloidally dispersed electrically in an oil miscible organic medium until a viscous oil is obtained.

4. The process for bodying a polymerizable semi-drying oil, which comprises heating the oil with a heavy metal colloidally dispersed electrically in an oil miscible organic medium until a viscous oil is obtained.

5. The process for bodying a polymerizable non-drying oil of the glyceride type, which comprises heating the oil with a heavy metal colloidally dispersed electrically in an oil miscible organic medium until a viscous oil is obtained.

6. The process for bodying a polymerizable oil of the glyceride type, which comprises heating the oil with colloidal cobalt electrically dispersed in an oil miscible organic medium until a viscous oil is obtained.

7. The process for bodying a polymerizable oil of the glyceride type, which comprises heating the oil with colloidal manganese electrically dispersed in an oil miscible organic medium until a viscous oil is obtained.

8. The process for bodying a polymerizable oil of the glyceride type, which comprises heating the oil with colloidal iron electrically dispersed in an oil miscible organic medium until a viscous oil is obtained.

9. The process for bodying a polymerizable oil of the glyceride type, which comprises heat-bodying the oil with a colloidal heavy metal electrically dispersed in butanol.

10. The process for bodying a polymerizable oil of the glyceride type, which comprises heat-bodying the oil with a colloidal heavy metal electrically dispersed in turpentine.

11. A process of accelerating the polymerization of oil of the glyceride type which comprises adding a small quantity of a colloidal electrically dispersed heavy metal to the oil during heat treatment of the oil.

12. An improved process of polymerizing oil of the glyceride type which comprises adding a minute quantity of a colloidal electrically dispersed heavy metal catalyst to the oil and heating the mixture until polymerization is effected.

13. A process as set forth in claim 12 wherein the oil undergoing treatment is linseed oil.

14. A process as set forth in claim 12 wherein the metal is dispersed in a higher alcohol.

15. A process as set forth in claim 12 wherein the metal is dispersed by the use of an oscillating discharge.

16. A catalytic polymerization accelerator for fatty oils comprising a heavy metal colloidally dispersed in an oil miscible organic medium.

17. A catalytic polymerization accelerator for fatty oils comprising a colloidal electrically dispersed heavy metal.

18. A catalytic polymerization accelerator for fatty oils comprising a colloidal electrically dispersed heavy metal which is a member of a group consisting of cobalt, manganese, iron, lead, nickel, chromium, molybdenum, and tungsten.

19. A catalytic polymerization accelerator for fatty oils comprising a colloidal heavy metal electrically dispersed in an oil miscible organic medium.

20. A catalytic polymerization accelerator for fatty oils comprising a colloidal heavy metal electrically dispersed in butyl alcohol.

21. A catalytic polymerization accelerator for fatty oils comprising a colloidal heavy metal electrically dispersed in propyl alcohol.

22. A catalytic polymerization accelerator for fatty oils comprising a colloidal heavy metal electrically dispersed in turpentine.

WILHELM KRUMBHAAR.